W. BARR, Jr.
ACCOUNT FILE.
APPLICATION FILED SEPT. 6, 1910.

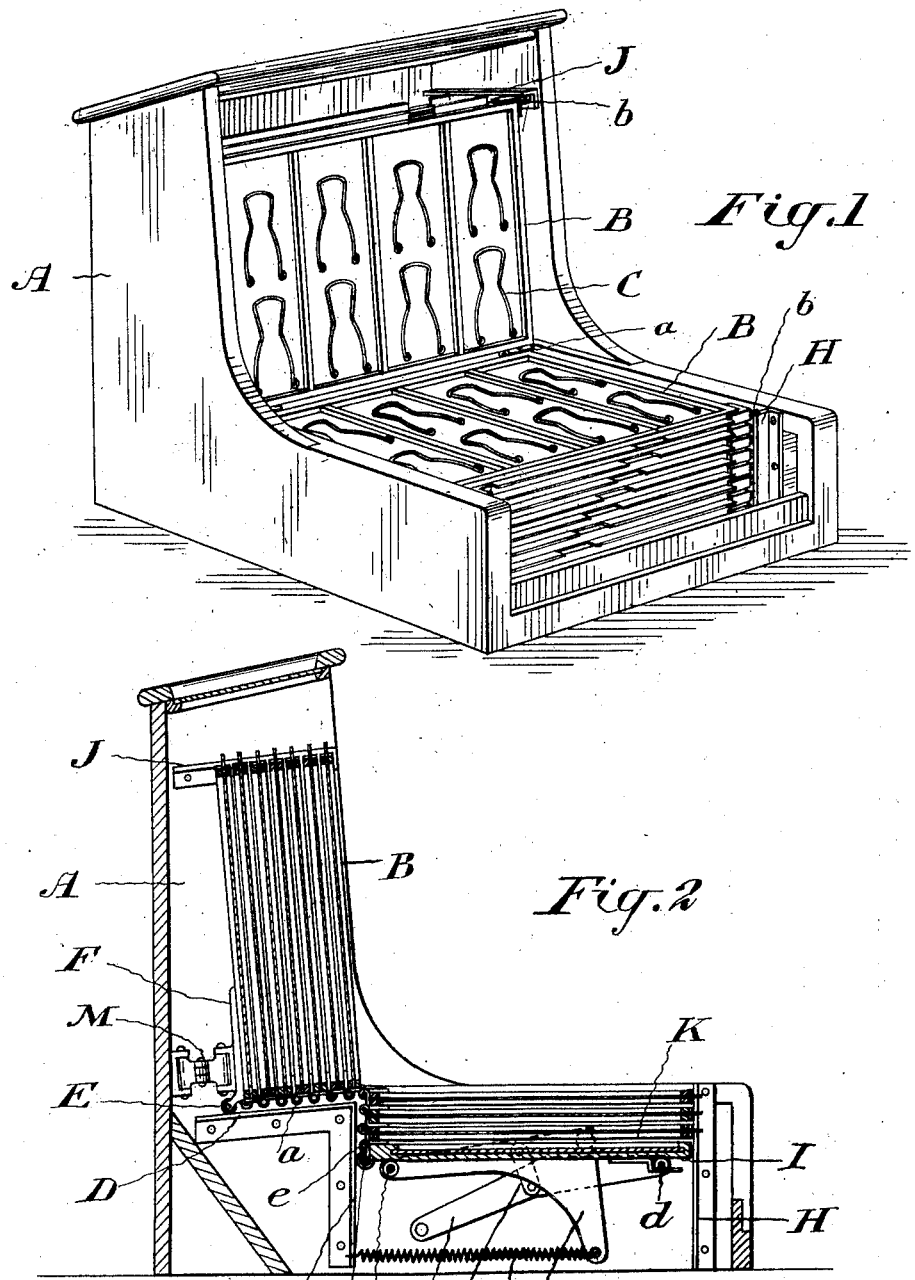

1,002,485.

Patented Sept. 5, 1911.

2 SHEETS—SHEET 2.

WITNESSES:

INVENTOR.

UNITED STATES PATENT OFFICE.

WILSON BARR, JR., OF HAMILTON, ONTARIO, CANADA.

ACCOUNT-FILE.

1,002,485.   Specification of Letters Patent.   Patented Sept. 5, 1911.

Application filed September 6, 1910. Serial No. 580,527.

*To all whom it may concern:*

Be it known that I, WILSON BARR, Jr., of the city of Hamilton, in the Province of Ontario, Canada, have invented certain new and useful Improvements in Account-Files, of which the following is a specification.

This invention relates to files in which account slips are filed on stiff leaves suitably supported so that any given leaf is immediately accessible. In designing such a file I have had two main objects in view— (1) it is desirable that each leaf when being used shall occupy exactly the same position as any other leaf when said other leaf is in use; (2) there must be no sliding movement of one leaf or another which tends to dislodge or spoil the accounts. The usual objects of cheapness and durability of construction and reliability of action are of course also sought.

This present invention relates to a modification of the invention described in my co-pending application, No. 512,853 and the particular object I have in view is the securing of substantially the same results by means differing in detail from those shown in said co-pending application.

I attain my objects by the constructions hereinafter particularly described and illustrated in the accompanying drawings, in which—

Figure 3:
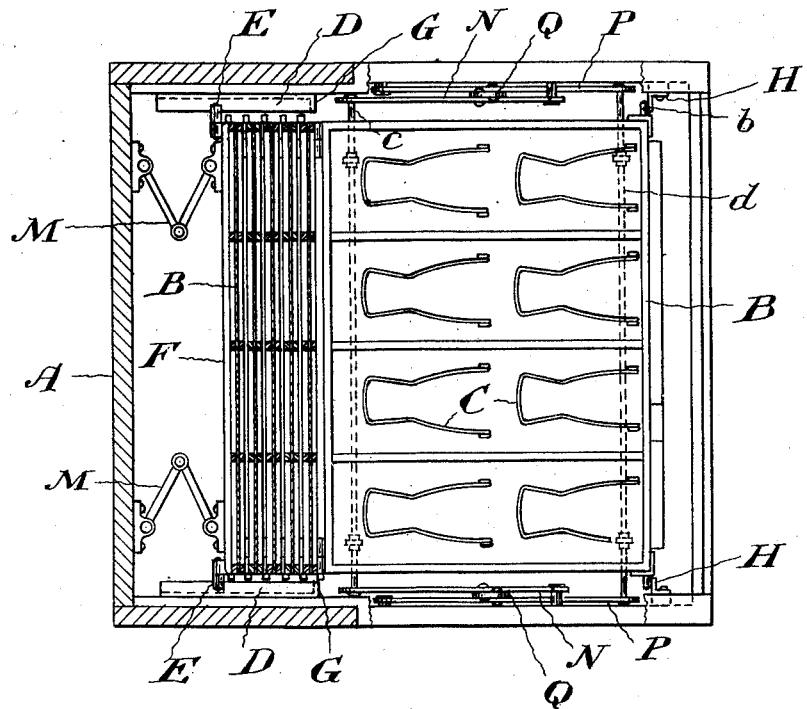
Figure 4:
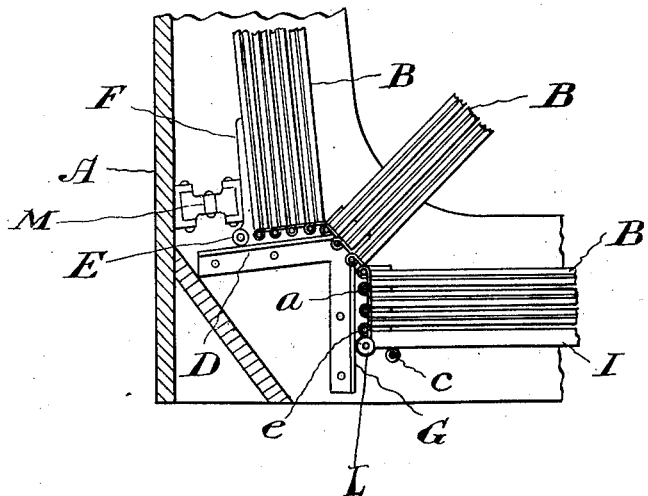

Figure 1 is a perspective view of my improved account file. Fig. 2 is a vertical section of the same. Fig. 3 is a plan view partly in section. Fig. 4 is a vertical section of part of the device, showing how a bunch of leaves may be turned from vertical to horizontal position.

In the drawings like letters of reference indicate corresponding parts in the different figures.

A is the casing, preferably of L-shape, as shown.

B are a series of account filing leaves which are of ordinary construction and are provided with the account holding clips C. These leaves are pivotally connected at their lower or rearward edges by means of the hinges $a$, so that one or more of said leaves may occupy either a substantially vertical or a substantially horizontal position. I aim particularly in the present invention to so arrange the apparatus that when any leaf occupies the position at the front of the vertical leaves or at the top of the horizontal leaves that it will occupy substantially the same position as any of the other leaves under like circumstances. I accomplish this by arranging it so that the leaves, when in a vertical position, are restricted substantially to a backward or forward movement and when horizontal are restricted substantially to a vertical movement, the guiding means being so arranged that one or more of the leaves may be turned freely from the vertical to the horizontal position, or vice versa.

To guide the leaves when vertical, I provide the pair of tracks D which, though approximately horizontal, will usually incline somewhat toward the rear to give the leaves a slight rearward inclination. The tracks D are engaged by the projections E, which are preferably rollers journaled on the last leaf F. This last leaf may be a complete leaf but is preferably only a half leaf being used more particularly as a follower for the rest of the leaves. The leaves when in their horizontal position are guided by the substantially vertical tracks G and H. The tracks G are located adjacent the forward ends of the tracks D while the tracks H are located toward the forward part of the casing A. Between these tracks G and H a table I is movable, being normally vertically spring pressed as hereinafter described and provided with projections L, preferably rollers engaging the forward sides of the tracks G. Theoretically this table may be considered as the first leaf.

It will be noted that the vertical pressure of the table tends to push up the front vertical leaf. This tendency is restrained by the use of the pair of tracks J which are engaged by the upper edges of the leaves B. These edges are preferably provided with the rollers $b$ to reduce friction. The first leaf K is also preferably hinged to the table by a hinge $e$ thus restraining the bunch of leaves when all are vertical from backward or forward movement in a horizontal direction, as well as restraining the horizontal leaves from backward movement. The tracks H are preferably adapted to be engaged by the rollers $b$ to restrain the leaves from forward movement in a horizontal direction. From this construction it follows that though the leaves are accurately guided when in either the horizontal or vertical positions, yet the corners of the leaves will freely pass the edges of the tracks D and G when a bunch of leaves is being turned from the horizontal to the vertical position, as indicated in Fig. 4.

There exists a tendency for the last leaf F to tilt backward when the remaining leaves have been drawn down to a horizontal position. I obviate this trouble by providing a pair of toggle levers M having wide bearings on the back of the casing and on the last leaf or follower F. These absolutely prevent any tilting of the last leaf and indeed in a small cabinet may render the use of tracks D unnecessary. While any suitable means may be provided for yieldingly supporting the table I, yet I prefer the mechanism shown. A pair of bent levers N are journaled on the sides of the casing and are connected by the cross bar C. A coil spring O connected to one end of this lever and to the casing presses the cross bar up against the under side of the table. A second pair of bent levers P are pivoted on the sides of the casing and are connected by a cross bar d engaging the under side of the table I at the opposite end to the cross bar c. These bent levers P are connected with the bent levers N by means of the links Q whereby they move together and impart a similar movement to each of the cross bars c and d.

From this construction it follows that as each leaf is turned down from a vertical to a horizontal position the table is depressed the thickness of one leaf, the next vertical leaf going forward to the position formerly occupied by the leaf just turned down. It follows then that when either side of a leaf is exposed the exposed side occupies the same position as the similarly exposed side of every other leaf in the file. When all the leaves are in the vertical position they may be withdrawn from the file by disconnecting the last leaf from the toggles F, and by disconnecting the hinges e of the first leaf from the table. It will be noted that at no time is any rubbing movement of one leaf on the other in any way possible.

What I claim as my invention is:—

1. In an account file the combination of a plurality of account holding leaves pivotally connected at their lower edges whereby one or more of the said leaves may occupy either a substantially vertical or a substantially horizontal position; substantially horizontal guide tracks; projections on the last leaf riding on said tracks; a second pair of tracks substantially parallel to and distant from the first with the under side of which the upper edge of each leaf may engage; a pair of substantially vertical tracks; projections vertically movable with the first leaf adapted to engage the forward sides of the vertical tracks and yielding means tending to press the leaves upward when they are in the substantially horizontal position.

2. In an account file the combination of a plurality of account holding leaves pivotally connected at their lower edges whereby one or more of said leaves may occupy either a substantially vertical or a substantially horizontal position; substantially horizontal guide tracks; projections on the last leaf riding on said tracks; a second pair of tracks substantially parallel to and distant from the first with the under side of which the upper edge of each leaf may engage; a pair of substantially vertical tracks; projections vertically movable with the first leaf adapted to engage the forward sides of the vertical tracks; a second pair of vertical tracks substantially parallel to and distant from the first vertical tracks and with the rearward side of which the outer edges of the leaves may engage when horizontal; and yielding means tending to press the leaves upward when they are in the substantially horizontal position.

3. In an account file the combination of a plurality of account holding leaves pivotally connected at their lower edges whereby one or more of said leaves may occupy either a substantially vertical or a substantially horizontal position; a pair of substantially horizontal toggle levers each pivoted at one end on a stationary part and at the other on the last leaf; guiding means tending to restrict the leaves to a substantially vertical movement only when they are horizontal; and yielding means tending to press the leaves upward when they are in the substantially horizontal position, the guiding means being adapted to permit of the leaves being swung from the vertical position to the horizontal, and vice versa.

This 31st day of August 1910.

WILSON BARR, JR.

Signed in the presence of—
F. R. WALTER,
GEO. T. SELLENS.